(12) United States Patent
Yamada et al.

(10) Patent No.: US 8,771,147 B2
(45) Date of Patent: Jul. 8, 2014

(54) COAST STOP VEHICLE AND CONTROL METHOD THEREOF

(75) Inventors: Naohiro Yamada, Atsugi (JP); Keichi Tatewaki, Atsugi (JP); Shinichiro Watanabe, Yokohama (JP); Noritaka Aoyama, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 308 days.

(21) Appl. No.: 13/306,574

(22) Filed: Nov. 29, 2011

(65) Prior Publication Data
US 2012/0142494 A1    Jun. 7, 2012

(30) Foreign Application Priority Data

Dec. 2, 2010    (JP) ................... 2010-269027

(51) Int. Cl.
*B60W 10/02*    (2006.01)
*B60W 10/04*    (2006.01)
(52) U.S. Cl.
USPC .......................................... 477/176; 477/180
(58) Field of Classification Search
USPC .......... 477/166, 168, 169, 174–176, 180, 181
See application file for complete search history.

(56) References Cited

U.S. PATENT DOCUMENTS

| | | | | |
|---|---|---|---|---|
| 5,362,287 | A | * | 11/1994 | Tanaka et al. ................. 477/175 |
| 5,733,223 | A | | 3/1998 | Matsubara et al. |
| 5,935,043 | A | * | 8/1999 | Watanabe et al. ............. 477/169 |
| 6,074,326 | A | * | 6/2000 | Sakakibara et al. .......... 477/169 |
| 6,090,008 | A | * | 7/2000 | Hoshiya et al. ................. 477/84 |
| 6,102,831 | A | * | 8/2000 | Wakahara et al. ............. 477/169 |
| 6,719,664 | B2 | * | 4/2004 | Ito et al. ........................ 477/176 |
| 6,939,268 | B2 | * | 9/2005 | DeVore et al. ................ 477/175 |
| 2002/0103055 | A1 | | 8/2002 | Tani et al. |
| 2006/0073937 | A1 | * | 4/2006 | Tohta et al. ..................... 477/62 |
| 2007/0072737 | A1 | | 3/2007 | Dickinson |
| 2009/0018757 | A1 | | 1/2009 | Kobayashi et al. |
| 2009/0192018 | A1 | * | 7/2009 | Hoffmeister et al. ......... 477/176 |
| 2010/0184562 | A1 | | 7/2010 | Senda et al. |

FOREIGN PATENT DOCUMENTS

| | | |
|---|---|---|
| EP | 1 227 230 A2 | 7/2002 |
| JP | 58-166165 A | 10/1983 |
| JP | 2002-274224 A | 9/2002 |
| JP | 2010-164143 A | 7/2010 |

* cited by examiner

*Primary Examiner* — Justin Holmes
(74) *Attorney, Agent, or Firm* — Foley & Lardner LLP (57) ABSTRACT

A coast stop vehicle which executes coast stop control for stopping an engine during the travel of a vehicle, is provided with a frictional engagement element provided between the engine and a driving wheel, a first deceleration calculating unit which calculates first deceleration, which is rotation deceleration of a rotation shaft on the driving wheel side of the frictional engagement element, and an engagement-state control unit which controls an engagement state of the frictional engagement element so that decrease of the engine rotation speed is suppressed on the basis of the first deceleration while the coast stop control is executed.

11 Claims, 7 Drawing Sheets

COAST STOP VEHICLE AND CONTROL METHOD THEREOF

TECHNICAL FIELD OF THE INVENTION

The present invention relates to a coast stop vehicle and a control method thereof.

BACK GROUND OF THE INVENTION

A device which prolongs time until rotation of an engine stops by directly coupling a direct coupling unit of a transmission mechanism provided between the engine and a vehicle drive shaft while fuel injection is stopped if the engine is to be automatically stopped (coast stop) during the travel of the vehicle is disclosed in JP2010-164143A. In this device, when an engine is to be re-started, attention is paid to the fact that time required for re-start of the engine by resumption of fuel injection is shorter than that required for the re-start of the engine using a starter, and in JP2010-164143A, decrease of an engine rotation speed is suppressed by directly coupling the direct coupling unit, and the engine rotation speed can be made to remain for a long time in a rotation region in which the engine can be restarted by resuming fuel injection. That is, by directly coupling the direct coupling unit, time during which the engine can be re-started only by resumption of fuel injection after automatic stop of the engine can be made longer than the case not directly coupling the direct coupling unit, and the engine can be re-started quickly even if acceleration is requested by a driver over a wide range, whereby driving performance is improved.

SUMMARY OF THE INVENTION

However, if the direct coupling unit is directly coupled if deceleration of a rotation shaft of the engine is smaller than deceleration of a vehicle drive shaft, the deceleration of the rotation shaft of the engine while fuel injection is stopped becomes larger than the deceleration of the rotation shaft of the engine while the direct coupling unit is not directly coupled. In the above-described invention, this point is not considered, and depending on an operation state of the vehicle, time during which the engine can be re-started only by fuel injection if a request to re-start the engine is issued might become shorter by the direct coupling of the direct coupling unit, which is a problem.

The present invention was made in order to solve this problem and has an object to prolong time during which the engine can be re-started only by starting fuel injection if a request to re-start the engine is issued while the fuel injection is stopped.

A coast stop vehicle according to a certain aspect of the present invention is a coast stop vehicle in which coast stop control for stopping an engine during the travel of the vehicle is executed. The coast stop vehicle is provided with a frictional engagement element provided between the engine and a drive wheel, a first deceleration calculating unit which calculates first deceleration, which is rotation deceleration of a rotation shaft on the driving wheel side of the frictional engagement element, and engagement-state control unit which controls an engagement state of the frictional engagement element on the basis of the first deceleration while the coast stop control is executed so that decrease of the engine rotation speed is suppressed.

A control method of a coast stop vehicle according to another aspect of the present invention is a control method of a coast stop vehicle, which executes coast stop control for stopping the engine during the travel of the vehicle. The control method includes calculating first deceleration, which is rotation deceleration of the rotation shaft on the driving wheel side of the frictional engagement element provided between the engine and the driving wheels, and controlling decrease of the engagement state of the frictional engagement element so that decrease of the engine rotation speed is suppressed on the basis of the first deceleration while the coast stop control is executed.

According to these aspects, while the coast stop control is executed, the engagement state of the frictional engagement element is controlled on the basis of the first deceleration, which is the rotation deceleration of the frictional engagement element on the driving wheel side, so that the drop in the engine rotation speed is made smaller, and thus, if a request for re-acceleration is made during the coast stop control, time during which the engine can be re-started only by starting fuel injection can be prolonged.

DESCRIPTION OF PREFERRED EMBODIMENT

A first embodiment of the present invention will be described below by referring to the attached drawings. Note that, in the following explanation, a "speed ratio" of a transmission mechanism is a value obtained by dividing an input rotation speed of the transmission mechanism by an output rotation speed of the transmission mechanism. Also, a "lowest speed ratio" is a maximum speed ratio of this transmission mechanism used such as at the time of starting a vehicle and a "highest speed ratio" is a minimum speed ratio of the transmission mechanism.

Figure 1:
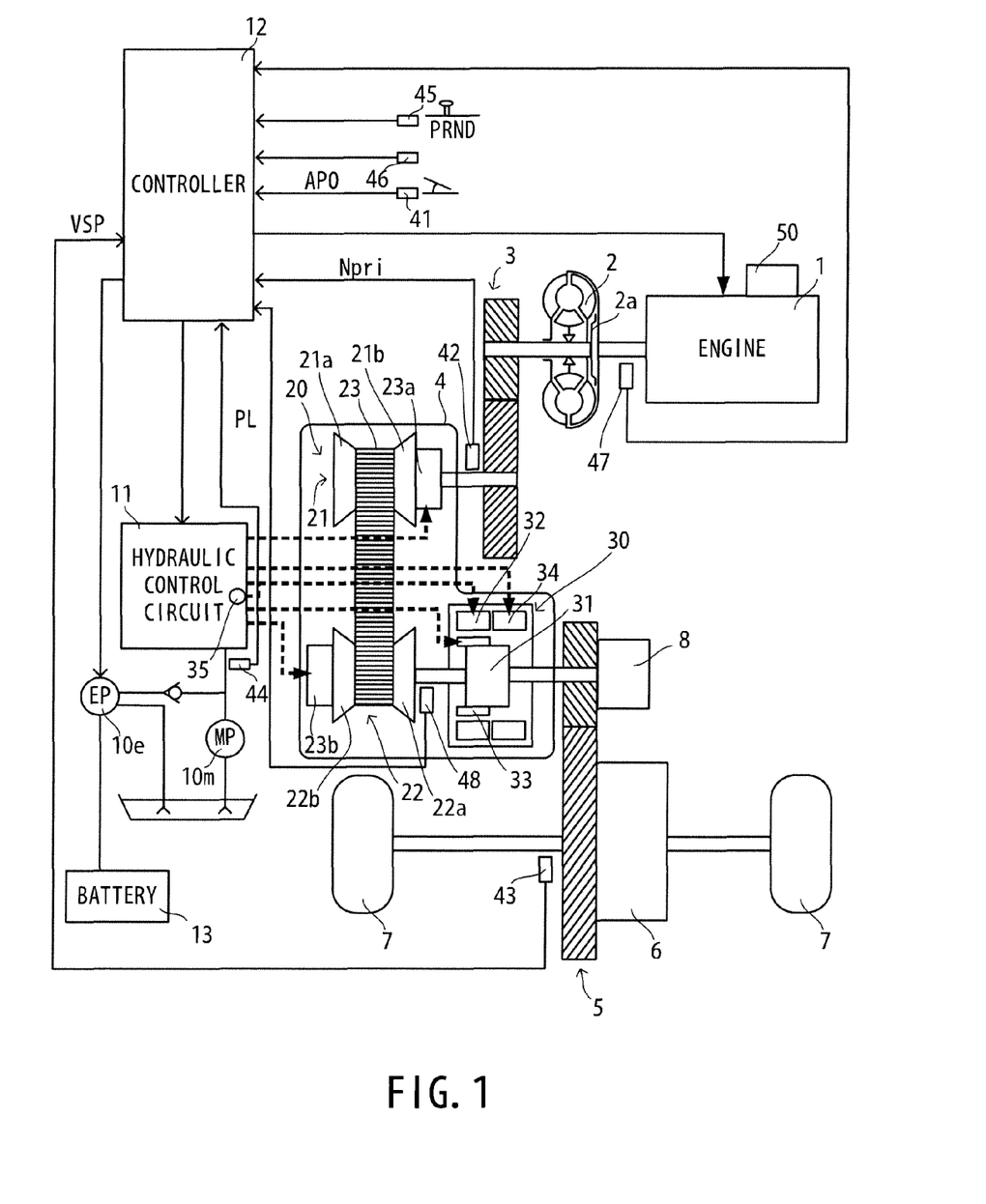
FIG. 1 is a schematic configuration diagram of a coast stop vehicle of a first embodiment.

FIG. 1 is a schematic construction diagram of a coast stop vehicle according to a first embodiment of the present invention. This vehicle includes an engine 1 as a driving source, and output rotation of the engine 1 is transmitted to driving wheels 7 through a torque converter 2 with a lock-up clutch 2a, a first gear train 3, a continuously variable transmission (hereinafter simply referred to as a "transmission 4"), a second gear train 5, and a final speed reducer 6. The second gear train 5 includes a parking mechanism 8 which mechanically locks an output shaft of the transmission 4 in a parked state so as not to be able to rotate. The engine 1 includes a starter 50 which rotates a crankshaft of the engine 1 at the start of the engine 1.

The transmission 4 is provided with a mechanical oil pump 10m to which the rotation of the engine 1 is inputted and which is driven by using a part of power of the engine 1 and an electrical oil pump 10e which is driven upon receiving power supply from a battery 13. The electrical oil pump 10e is formed of an oil pump main body, and an electric motor and a motor driver for driving and rotating the oil pump main body and can control a driving load to a desired load or in multiple stages. Further, the transmission 4 includes a hydraulic control circuit 11 which adjusts a hydraulic pressure (hereinafter referred to as a "line pressure PL") from the mechanical oil pump 10*m* or the electrical oil pump 10*e* and supplies it to each portion of the transmission 4.

The transmission 4 includes a V-belt continuously variable transmission mechanism (hereinafter referred to as a "variator 20") and a sub-transmission mechanism 30 disposed in series with the variator 20. The phrase "to be disposed in series" means that the variator 20 and the sub-transmission mechanism 30 are disposed in series in a power transmission path from the engine 1 to the driving wheels 7. The sub-transmission mechanism 30 may be directly connected to the output shaft of the variator 20 in this example or may be connected through another transmission or power transmission mechanism (a gear train, for example). Alternatively, the sub-transmission mechanism 30 may be connected to a previous stage (input shaft side) of the variator 20.

The variator 20 is provided with a primary pulley 21, a secondary pulley 22, and a V-belt 23 mounted between the pulleys 21 and 22. Each of the pulleys 21 and 22 includes a fixed conical plate 21*a*, 22*a*, a movable conical plate 21*b*, 22*b* arranged with a sheave surface opposed to this fixed conical plate 21*a*, 22*a* and forming a V-groove between the fixed conical plate 21*a*, 22*a* and the movable conical plate 21*b*, 22*b*, and a hydraulic cylinder 23*a*, 23*b* disposed on the back face of the movable conical plate 21*b*, 22*b* for displacing the movable conical plate 21*b*, 22*b* in the axial direction. By adjusting a hydraulic pressure supplied to the hydraulic cylinders 23*a* and 23*b*, the width of the V-groove is changed, a contact radius between the V-belt 23 and each of the pulleys 21 and 22 is changed, and a speed ratio of the variator 20 is continuously varied.

The sub-transmission mechanism 30 is a transmission mechanism having two forward speeds and one reverse speed. The sub-transmission mechanism 30 includes a Ravigneaux-type planetary gear mechanism 31 in which carriers of two planetary gears are coupled, and a plurality of frictional engagement elements (a low brake 32, a high clutch 33, and a reverse brake 34) connected to a plurality of rotation elements constituting the Ravigneaux-type planetary gear mechanism 31 and changing the connection state thereof. If hydraulic pressure supplied to each of the frictional engagement elements 32 to 34 is adjusted to change an engagement/release state of each of the frictional engagement elements 32 to 34, the gear position of the sub-transmission mechanism 30 is changed.

For example, the sub-transmission mechanism 30 is set to a first gear position if the low brake 32 is engaged and the high clutch 33 and the reverse brake 34 are released. The sub-transmission mechanism 30 is set to a second gear position with a speed ratio lower than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

The respective frictional engagement elements are provided before or following the variator 20 on the power transmission path, and any of them enables power transmission of the transmission 4 when being engaged while disabling power transmission of the transmission 4 when being released.

Further, an accumulator 35 is connected at an intermediate position of an oil passage for supplying the hydraulic pressure to the low brake 32. The accumulator 35 delays the supply and discharge of the hydraulic pressure to and from the low brake 32, suppresses a sudden increase in the hydraulic pressure supplied to the low brake 32 by accumulating the hydraulic pressure at the time of selecting an N-D shift and prevents the occurrence of a shock due to sudden engagement of the low brake 32.

Figure 2:
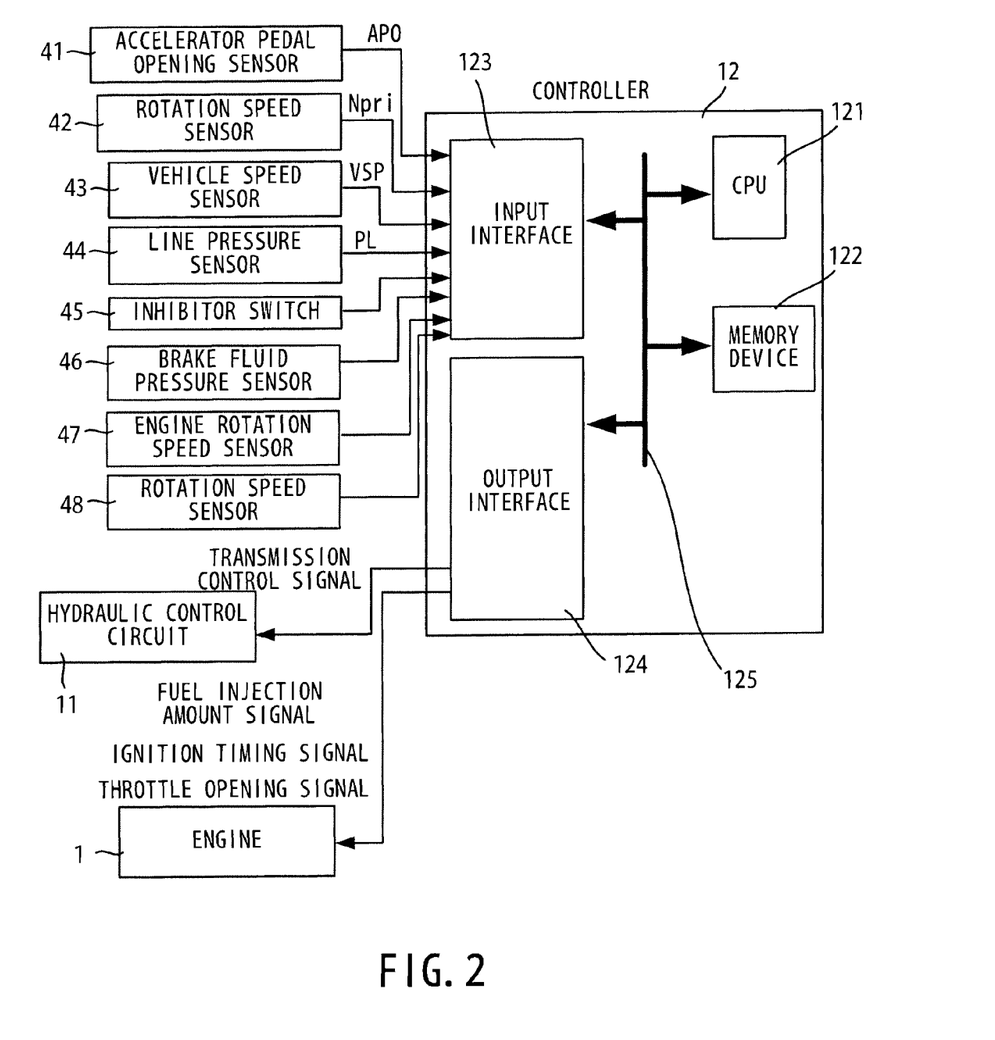
FIG. 2 is a schematic configuration diagram of a controller of the first embodiment.

A controller 12 is a controller which comprehensively controls the engine 1 and the transmission 4 and is formed of, as illustrated in FIG. 2, a CPU 121, a storage device 122 composed of a RAM and a ROM, an input interface 123, an output interface 124, and a bus 125 connecting them to each other.

Into the input interface 123, an output signal of an accelerator pedal opening sensor 41 which detects an accelerator pedal opening APO, which is an operation amount of an accelerator pedal, an output signal of a rotation speed sensor 42 which detects an input rotation speed of the transmission 4 (rotation speed of the primary pulley 21), an output signal of a rotation speed sensor 48 which detects an output rotation speed of the transmission 4 (rotation speed of the secondary pulley 22), an output signal of a vehicle speed sensor 43 which detects a vehicle speed VSP, an output signal of a line pressure sensor 44 which detects the line pressure PL, an output signal of an inhibitor switch 45 which detects a position of a select lever, an output signal of a brake fluid pressure sensor 46 which detects a brake fluid pressure, an output signal of an engine rotation speed sensor 47 which detects a rotation speed of a crankshaft of the engine 1 and the like are inputted.

In the storage device 122, a control program of the engine 1, a transmission control program of the transmission 4, various maps tables used in these programs are stored. The CPU 121 reads out and implements the programs stored in the storage device 122, performs various types of calculation processing on the various signals inputted through the input interface 123, generates a fuel injection amount signal, an ignition timing signal, a throttle opening signal, a transmission control signal, and a drive signal of the electrical oil pump 10*e* and outputs the generated signals to the engine 1, the hydraulic control circuit 11, the motor driver of the electrical oil pump 10*e* through an output interface 124. Various values used by the CPU 121 in the calculation processing and the calculation results are stored in the storage device 122 as appropriate.

The hydraulic control circuit 11 is constituted by a plurality of flow passages and a plurality of hydraulic control valves. The hydraulic control circuit 11 controls the plurality of hydraulic control valves so as to switch the supply paths of the hydraulic pressures and prepares a required hydraulic pressure from the hydraulic pressure produced in the mechanical oil pump 10*m* or the electrical oil pump 10*e* on the basis of the transmission control signal from the controller 12 and supplies it to each portion of the transmission 4. As a result, the speed ratio of the variator 20 and the gear position of the sub-transmission mechanism 30 are changed, and the gear of the transmission 4 is shifted.

Figure 3:
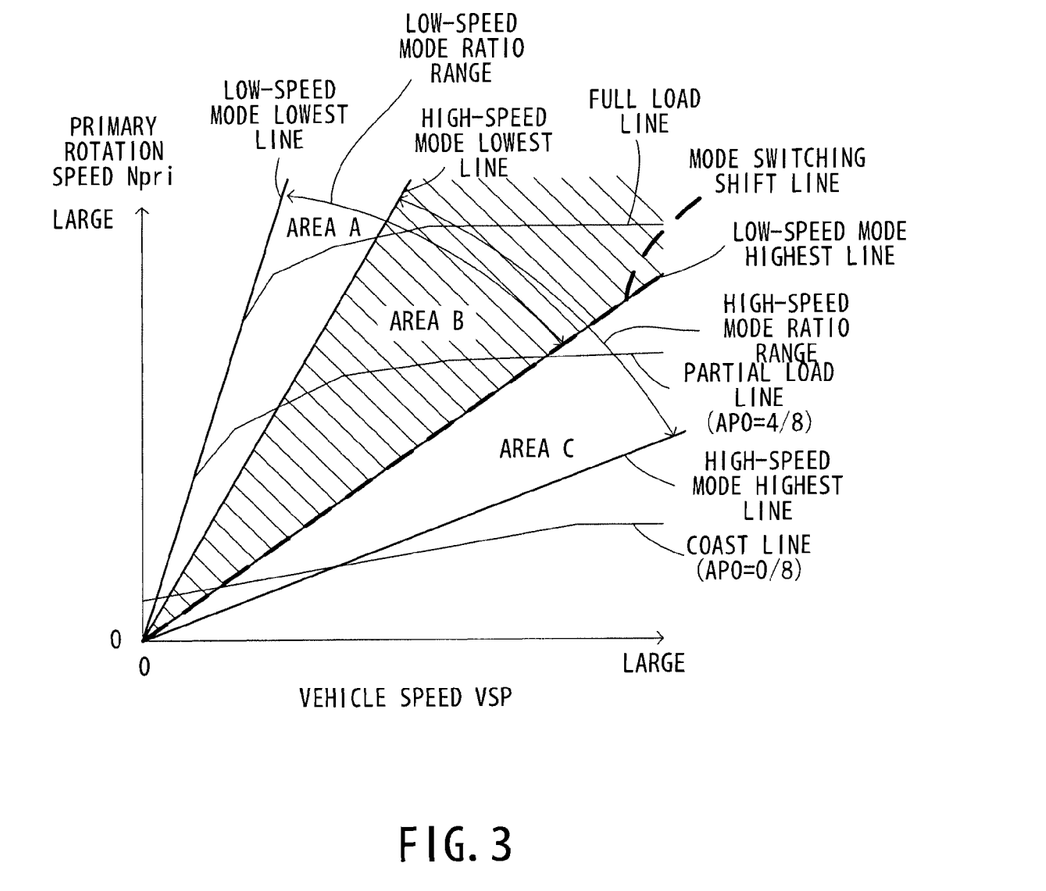
FIG. 3 illustrates an example of a shift map of the first embodiment.

FIG. 3 illustrates an example of a shift map stored in the storage device 122. The controller 12 controls the variator 20 and the sub-transmission mechanism 30 on the basis of this shift map in accordance with the operation state of the vehicle (in this embodiment, the vehicle speed VSP, the primary rotation speed Npri, the secondary rotation speed Nsec, and the accelerator pedal opening APO).

In this shift map, an operating point of the transmission 4 is defined by the vehicle speed VSP and the primary rotation speed Npri. The inclination of the line connecting the operating point of the transmission 4 and the zero point at the lower left corner of the shift map corresponds to the speed ratio of the transmission 4 (overall speed ratio obtained by multiplying the speed ratio of the variator 20 by the speed ratio of the sub-transmission mechanism 30, and hereinafter referred to as a "through speed ratio"). In this shift map, a shift line is set for each accelerator pedal opening APO similarly to a shift map of a conventional V-belt continuously variable transmission, and the transmission 4 is shifted in accordance with the shift line selected based on the accelerator pedal opening APO. Note that, for simplicity, only a full load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

If the transmission 4 is in a low-speed mode, the transmission 4 can be shifted between the low-speed mode lowest line obtained by setting the speed ratio of the variator 20 to the lowest speed ratio and the low-speed mode highest line obtained by setting the speed ratio of the variator 20 to the highest speed ratio. In this case, the operating point of the transmission 4 moves within an A region and a B region. On the other hand, if the transmission 4 is in the high-speed mode, the transmission 4 can be shifted between the high-speed mode lowest line obtained by setting the speed ratio of the variator 20 to the lowest speed ratio and the high-speed mode highest line obtained by setting the speed ratio of the variator 20 to the highest speed ratio. In this case, the operating point of the transmission 4 moves within the B region and a C region.

The speed ratio of each gear position of the sub-transmission mechanism 30 is set such that the speed ratio corresponding to the low-speed mode highest line (low-speed mode highest speed ratio) is smaller than the speed ratio corresponding to the high-speed mode lowest line (high-speed mode lowest speed ratio). As a result, the range of the through speed ratio of the transmission 4 that can be set in the low-speed mode ("low-speed mode ratio range" in the figure) and the range of the through speed ratio of the transmission 4 that can be set in the high speed mode ("high-speed mode ratio range" in the figure) are partially overlapped, and if the operating point of the transmission 4 is in the B region sandwiched between the high-speed mode lowest line and the low-speed mode highest line, the transmission 4 can select either of the low-speed mode and the high-speed mode.

Further, on the shift map, a mode switching shift line at which the sub-transmission mechanism 30 is shifted is so set as to overlap the low-speed mode highest line. The through speed ratio corresponding to the mode switching shift line (hereinafter referred to as a "mode switching speed ratio mRatio") is set at a value equal to the low-speed mode highest speed ratio. The mode switching shift line is set as above because the smaller the speed ratio of the variator 20 is, the smaller the input torque into the sub-transmission mechanism 30 becomes, and a shift shock when the sub-transmission mechanism 30 is shifted can be suppressed.

When the operating point of the transmission 4 crosses the mode switching shift line, that is, when the actual value of the through speed ratio (hereinafter referred to as an "actual through speed ratio Ratio") changes over the mode switching speed ratio mRatio, the controller 12 performs synchronization shift, which will be described below, and switching between the high-speed mode and the low-speed mode.

In the synchronization shift, the controller 12 shifts gear of the sub-transmission mechanism 30 and changes the speed ratio of the variator 20 in a direction opposite to the direction in which the speed ratio of the sub-transmission mechanism 30 changes. At this time, an inertia phase in which the speed ratio of the sub-transmission mechanism 30 actually changes is synchronized with a period during which the speed ratio of the variator 20 is changed. The speed ratio of the variator 20 is changed in the direction opposite to the direction in the change of the speed ratio of the sub-transmission mechanism 30 so that the change in the input rotation caused by a difference in the actual through speed ratio Ratio does not give a sense of discomfort to the driver.

Specifically, if the actual through speed ratio Ratio of the transmission 4 changes over the mode switching speed ratio mRatio from the Low side to the High side, the controller 12 changes the gear position of the sub-transmission mechanism 30 from the first speed to the second speed (1-2 shift) and also changes the speed ratio of the variator 20 to the Low side.

On the contrary, if the actual through speed ratio Ratio of the transmission 4 changes over the mode switching speed ratio mRatio from the High side to the Low side, the controller 12 changes the gear position of the sub-transmission mechanism 30 from the second speed to the first speed (2-1 shift) and changes the speed ratio of the variator 20 to the High side.

Also, the controller 12 executes coast stop control, which will be described below, in order to suppress a fuel consumption amount.

The coast stop control is control in which the fuel consumption amount is suppressed by automatically stopping (coast stop) the engine 1 while the vehicle is running in a low vehicle speed region. This control is common to fuel cut control executed when accelerator is off in a point that fuel supply to the engine 1 is stopped but different therefrom in a point that a lock-up clutch 2a is disengaged so as to cut off the power transmission path between the engine 1 and the driving wheels 7 and to fully stop the rotation of the engine 1.

Upon executing the coast stop control, the controller 12 first makes judgment on conditions a to c described below, for example. These conditions are, in other words, conditions for determining whether the driver has an intention to stop the vehicle or not.

a: accelerator pedal is not depressed at all (accelerator pedal opening APO=0).

b: brake pedal is depressed (brake fluid pressure is at a predetermined value or more).

c: vehicle speed is a predetermined low vehicle speed (15 km/h, for example) or less.

If these coast stop conditions are all met, the coast stop control is executed.

Figure 4:
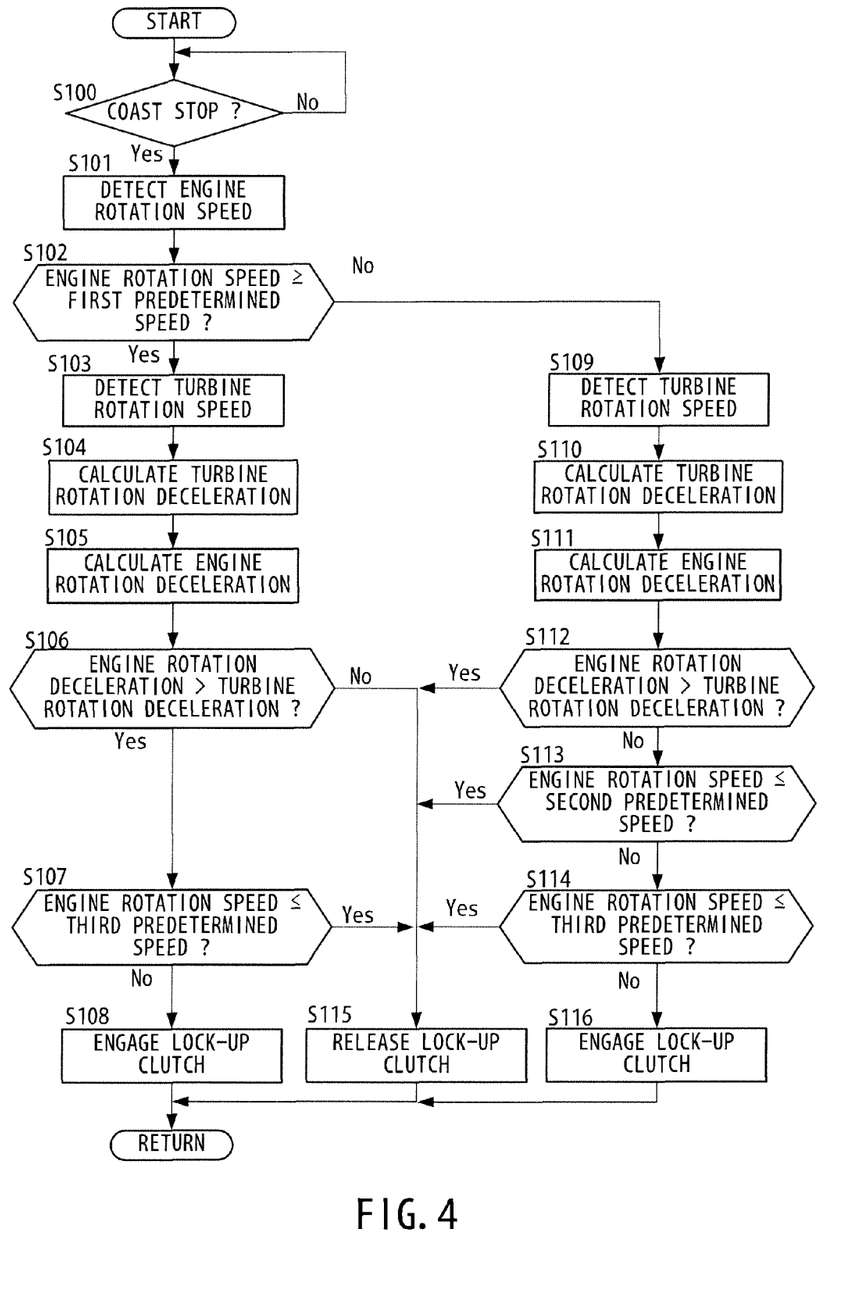
FIG. 4 is a flowchart for explaining the coast stop control of the first embodiment.

Next, the coast stop control of this embodiment will be described using the flowchart in FIG. 4.

At Step S100, the controller 12 determines whether the coast stop control is to be executed or not. Specifically, it is determined whether the above-described conditions are all met or not. If the above-described conditions are all met, the routine proceeds to Step S101. In this embodiment, during the coast stop control, the frictional engagement element (the low brake 32 or the high clutch 33) is engaged.

At Step S101, the controller 12 calculates the engine rotation speed on the basis of the output signal from the engine rotation speed sensor 47.

At Step S102, the controller 12 determines whether the engine rotation speed is at a first predetermined speed or more. If the engine rotation speed is at the first predetermined speed or more, the routine proceeds to Step S103, while if the engine rotation speed is smaller than the first predetermined speed, the routine proceeds to Step S109. The first predetermined speed is an engine rotation speed at which the engine 1 is re-started if fuel injection is resumed. That is, if the engine rotation speed is at the first predetermined speed or more, the engine 1 can be re-started only by starting the fuel injection without rotating the crankshaft of the engine 1 by the starter 50.

At Step S103, the controller 12 calculates a turbine rotation speed, which is a rotation speed of a turbine shaft of a torque converter 2 engaged with the first gear train 3. The turbine rotation speed is calculated by using the expression (1) on the basis of the output signal of the vehicle speed sensor 43 and the like.

$$\text{Turbine rotation speed} = \text{Vehicle speed VSP} \times 1000/(ig \times ip \times if \times 2pi \times r \times 60) \quad \text{expression (1)}$$

Here, reference character "ig" denotes a gear ratio of the first gear train, "ip" denotes a speed ratio for the transmission 4, if denotes a gear ratio of the second gear train 5, "pi" denotes circumference ratio, and "r" denotes a radius of the driving wheel 7.

At Step S104, the controller 12 calculates turbine rotation deceleration (first deceleration) from deviation between the turbine rotation speed calculated at Step S103 in the previous control and the turbine rotation speed calculated at Step S103 in the current control. The turbine rotation deceleration becomes a positive value if the turbine rotation speed is decreasing and becomes larger as the decrease amount of the turbine rotation speed per unit time becomes larger.

At Step S105, the controller 12 calculates the engine rotation deceleration (second deceleration) from deviation between the engine rotation speed detected at Step S101 in the previous control and the engine rotation speed detected at Step S101 in the current control. The engine rotation deceleration becomes a positive value if the engine rotation speed is decreasing and becomes larger as the decrease amount of the engine rotation speed per unit time becomes larger.

At Step S106, the controller 12 compares the turbine rotation deceleration calculated at Step S104 and the engine rotation deceleration calculated at Step S105. Then, if the engine rotation deceleration is larger than the turbine rotation deceleration, the routine proceeds to Step S107, while if the engine rotation deceleration is at the turbine rotation deceleration or less, the routine proceeds to Step S115.

At Step S107, the controller 12 compares the engine rotation speed and the third predetermined speed. Then, if the engine rotation speed is at the third predetermined speed or less, the routine proceeds to Step S115, while if the engine rotation speed is larger than the third predetermined speed, the routine proceeds to Step S108. The third predetermined speed is a rotation speed at which car body vibration occurs if a lock-up clutch 2a is engaged. That is, if the engine rotation speed becomes the third predetermined speed or less and the lock-up clutch 2a is engaged, car body vibration occurs.

At Step S108, the controller 12 engages the lock-up clutch 2a. If the engine rotation deceleration is larger than the turbine rotation deceleration, the crankshaft of the engine 1 is rotated by rotation transmitted from the driving wheels 7 by engaging the lock-up clutch 2a. As a result, decrease of the engine rotation speed can be suppressed. That is, a decreasing amount per time of the engine rotation speed can be made smaller.

At Step S102, if it is determined that the engine rotation speed is smaller than the first predetermined speed, at Step S109, the controller 12 calculates the turbine rotation speed by using the expression (1).

At Step S110, the controller 12 calculates the turbine rotation deceleration. The calculation method is the same as that at Step S104.

At Step S111, the controller 12 calculates the engine rotation deceleration. The calculation method is the same as that at Step S105.

At Step S112, the controller 12 compares the engine rotation deceleration calculated at Step S111 and the turbine rotation deceleration calculated at Step S110. Then, if the engine rotation deceleration is larger than the turbine rotation deceleration, the routine proceeds to Step S115, while if the engine rotation deceleration is at the turbine rotation deceleration or less, the routine proceeds to Step S113.

At Step S113, the controller 12 compares the engine rotation speed and the second predetermined speed. If the engine rotation speed is at the second predetermined speed or less, the routine proceeds to Step S115, while if the engine rotation speed is larger than the second predetermined speed, the routine proceeds to Step S114. The second predetermined speed is a speed at which the engine 1 can be re-started by rotating the crankshaft of the engine 1 by the starter 50. That is, if the engine rotation speed is at the second predetermined speed or less, the engine 1 can be re-started by rotating the crankshaft of the engine 1 by the starter 50.

At Step S114, the controller 12 compares the engine rotation speed and the third predetermined speed and if the engine rotation speed is at the third predetermined speed or less, the routine proceeds to Step S115, while if the engine rotation speed is larger than the third predetermined speed, the routine proceeds to Step S116.

At Step S115, the controller 12 releases the lock-up clutch 2a in the case of any of the following (1) to (4).

(1) The engine rotation speed is at the first predetermined speed or more and also, it is determined at Step S106 that the engine rotation deceleration is at the turbine rotation deceleration or less.

(2) The engine rotation speed is smaller than the first predetermined speed and also, it is determined at Step S112 that the engine rotation deceleration is larger than the turbine rotation deceleration.

(3) The engine rotation speed is smaller than the first predetermined speed and also, it is determined at Step S113 that the engine rotation speed is at the second predetermined speed or less.

(4) It is determined at Step S107 or Step S114 that the engine rotation speed is at the third predetermined speed or less.

If the engine 1 is at the first predetermined speed or more, the engine 1 can be re-started only by starting fuel injection to the engine 1. Thus, in the case of the above (1), by releasing the lock-up clutch 2a, the engine rotation speed is suppressed from becoming smaller than the first predetermined speed. As a result, time during which the engine 1 can be re-started only by starting the fuel injection to the engine 1 can be prolonged.

If the engine rotation speed is smaller than the first predetermined speed and also larger than the second predetermined speed, the engine 1 is not re-started even by injecting fuel to the engine 1 or the engine 1 cannot be re-started by rotating the crankshaft of the engine 1 by the starter 50. Thus, in the case of the above (2), by releasing the lock-up clutch 2a, the engine rotation speed is quickly lowered so that the engine rotation speed becomes at the second predetermined speed or less. As a result, if the engine rotation speed becomes smaller than the first predetermined speed, the engine 1 can be quickly re-started by using the starter 50.

If the engine rotation speed falls to the second predetermined speed or less, the engine 1 can be re-started by using the starter 50. If the crankshaft of the engine 1 is to be rotated by the starter 50, a load of rotation by the starter 50 is preferably small. Thus, in the case of the above (3), in preparation for re-acceleration after stop of the coast stop control, the lock-up clutch 2*a* is released. As a result, if the engine 1 is to be re-started by using the starter 50, the load of the starter 50 can be decreased. Also, the engine 1 can be re-started quickly.

In the case of the above (4), in order to prevent occurrence of car body vibration, the lock-up clutch 2*a* is released.

At Step S116, the controller 12 engages the lock-up clutch 2*a*. If the engine rotation speed is smaller than the first predetermined speed and also, larger than the second predetermined speed and moreover, the engine rotation deceleration is at the turbine rotation deceleration or less, by engaging the lock-up clutch 2*a*, the engine rotation speed is quickly lowered so that the engine rotation speed falls to the second predetermined speed or less.

Figure 5:
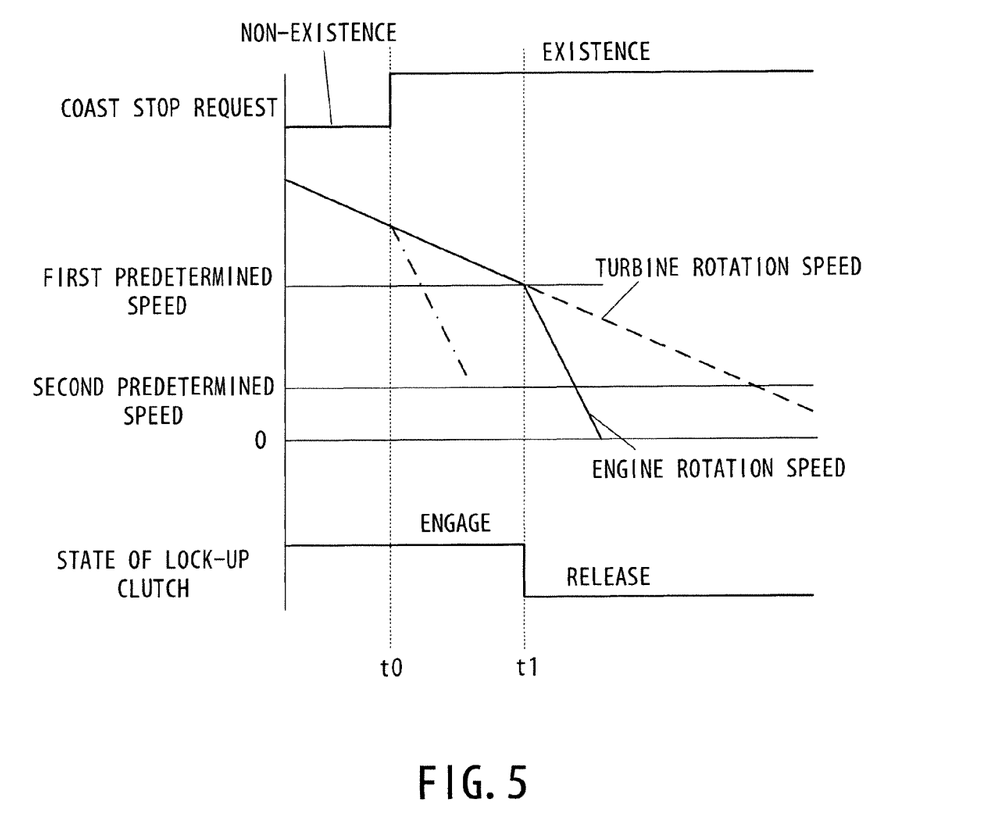
FIG. 5 is a time chart for explaining the coast stop control of the first embodiment.
Figure 6:
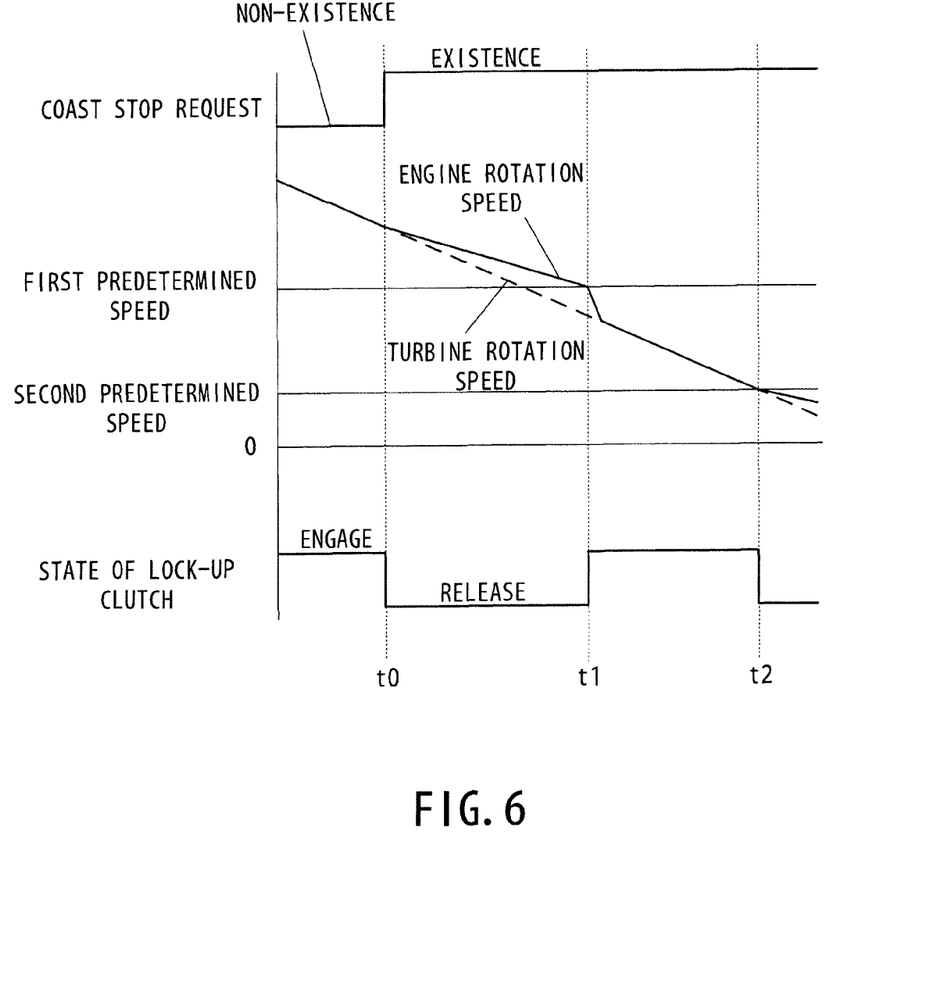
FIG. 6 is a time chart for explaining the coast stop control of the first embodiment.

Next, the coast stop control of this embodiment will be described by using the time charts in FIGS. 5 and 6.

First, the case in which the engine rotation deceleration is larger than the turbine rotation deceleration will be described by using the time chart in FIG. 5. In FIG. 5, the engine rotation speed is indicated by a solid line and the turbine rotation speed by a broken line.

At time t0, if the coast stop conditions are all met, fuel injection to the engine 1 is stopped. A change in the engine rotation speed in the case in which the lock-up clutch 2*a* is released without using this embodiment is indicated by a one-dot chain line. If the lock-up clutch 2*a* is released, since the engine rotation deceleration is larger than the turbine rotation deceleration, the engine rotation speed falls larger than the turbine rotation speed.

However, in this embodiment, since the lock-up clutch 2*a* is engaged, the crankshaft of the engine 1 is rotated by rotation transmitted from the driving wheels 7, and the decrease of the engine rotation speed is suppressed. Thus, time during which the engine rotation speed is at the first predetermined speed or more becomes longer than the case in which the lock-up clutch 2*a* is released without using this embodiment.

At time t1, if the engine rotation speed becomes smaller than the first predetermined speed, the lock-up clutch 2*a* is released. Since the engine rotation deceleration is larger than the turbine rotation deceleration, the engine rotation speed is quickly lowered by releasing the lock-up clutch 2*a*. As a result, the engine rotation speed can be quickly lowered to the second predetermined speed or less, and the engine 1 can be re-started by using the starter 50.

Next, the case in which the engine rotation deceleration is smaller than the turbine rotation deceleration will be described by using the time chart in FIG. 6. In FIG. 6, the engine rotation speed is indicated by a solid line, and the turbine rotation speed is indicated by a broken line.

At the time t0, if the coast stop conditions are all met, fuel injection to the engine 1 is stopped. Since the engine rotation deceleration is smaller than the turbine rotation deceleration, the lock-up clutch 2*a* is released. As a result, decrease of the engine rotation speed is suppressed, and the time during which the engine rotation speed is at the first predetermined speed or more becomes longer.

At the time t1, if the engine rotation speed becomes smaller than the first predetermined speed, the lock-up clutch 2*a* is engaged. As a result, the crankshaft of the engine 1 is rotated by the rotation of the driving wheels 7, and the engine rotation speed is lowered with the turbine rotation speed. Thus, the engine rotation speed is lowered quickly.

At time t2, if the engine rotation speed falls to the second predetermined speed or less, the lock-up clutch 2*a* is released, and preparation is made for re-start of the engine 1 using the starter 50.

Next, the advantages of the first embodiment will be described.

If re-start of the engine by resumption of fuel injection is compared with the re-start of the engine by using the starter 50, time required for re-start of the engine is shorter in the re-start of the engine by resumption of fuel injection (responsiveness is better). Thus, during the coast stop, the engine rotation speed is preferably in the rotation speed region in which the engine can be re-started by resumption of fuel injection as much as possible.

During the coast stop control, by controlling the engaged state of the lock-up clutch 2*a* on the basis of the engine rotation deceleration and the turbine rotation deceleration of the torque converter 2, decrease of the engine rotation speed is suppressed. As a result, if a request for re-acceleration is made during the coast stop control, time during which the engine 1 can be re-started only by starting fuel injection can be made longer.

If the engine rotation speed is at the first predetermined speed or more and also, the engine rotation deceleration is larger than the turbine rotation deceleration, the lock-up clutch 2*a* is engaged, and if the engine rotation speed is at the first predetermined speed or more and also, the engine rotation deceleration is at the turbine rotation deceleration or less, the lock-up clutch 2*a* is released so as to suppress decrease of the engine rotation speed and time during which the engine rogation speed is at the first predetermined speed or more is prolonged and the time during which the engine 1 can be re-started only by starting fuel injection can be made longer.

If the engine rotation speed is smaller than the first predetermined speed and also, the engine rotation deceleration is larger than the turbine rotation deceleration, the lock-up clutch 2*a* is released, and if the engine rotation speed is smaller than the first predetermined vehicle speed and also, the engine rotation deceleration is at the turbine rotation deceleration or less, the lock-up clutch 2*a* is engaged. As a result, if the engine rotation speed becomes smaller than the first predetermined speed, the engine rotation speed is quickly lowered so that the engine 1 can be re-started by using the starter 50. Thus, the region in which the engine 1 cannot be re-started only by injecting the fuel and also, the engine 1 cannot be re-started even by using the starter 50 can be quickly exited, and the engine 1 can be re-started quickly.

If the engine rotation speed falls to the second predetermines speed or less, by releasing the lock-up clutch 2*a*, the load of the starter 50 can be reduced when the engine 1 is re-started by the starter 50. As a result, if the coast stop control is to be stopped and re-acceleration is to be started, re-start of the engine 1 can be performed quickly. Also, power used by the starter 50 can be reduced.

If the engine rotation speed falls to the third predetermined speed or less, the lock-up clutch 2*a* is released so as to suppress occurrence of car body vibration.

By releasing the lock-up clutch 2*a* as a frictional engagement element arranged between the engine 1 and the driving wheels 7, the load of the starter 50 can be reduced if the engine 1 is to be re-started by the starter 50. Also, if occurrence of car body vibration is to be suppressed, by releasing the lock-up clutch 2*a* having responsiveness better than that of the frictional engagement element (the low brake 32 or the like) of the sub-transmission mechanism 30, occurrence of car body vibration can be quickly suppressed. Moreover, by releasing the lock-up clutch 2a which can transmit torque even if it is released, if the coast stop control is to be stopped and re-acceleration is to be started, re-acceleration can be realized quickly.

Next, a second embodiment of the present invention will be described.

Since the configuration of the coast stop vehicle of this embodiment is the same as in the first embodiment, the description will be omitted here.

Figure 7:
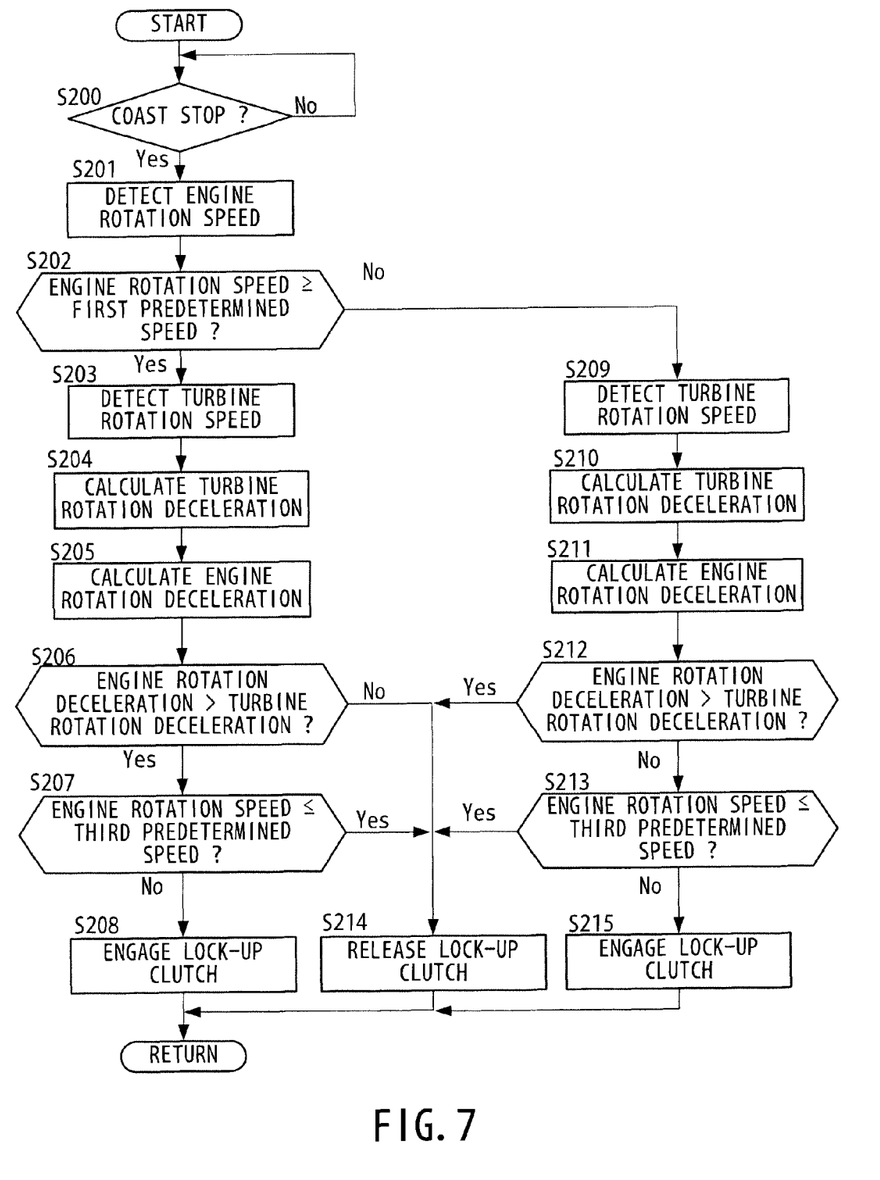
FIG. 7 is a flowchart for explaining the coast stop control of a second embodiment.

The coast stop control of this embodiment will be described by using the flowchart in FIG. 7. This embodiment is different from the first embodiment in that the lock-up clutch 2a is engaged even if the engine rotation speed falls to the second predetermined speed or less in the first embodiment.

The control from Step S200 to Step S212 is the same as the control from Step S100 to Step S112 in the first embodiment, and the description will be omitted here.

At Step S213, the controller 12 compares the engine rotation speed and the third predetermined speed. If the engine rotation speed is at the third predetermined speed or less, the routine proceeds to Step S214, while if the engine rotation speed is larger than the third predetermined speed, the routine proceeds to Step S215.

At Step S214, the controller 12 releases the lock-up clutch 2a. The controller 12 releases the lock-up clutch 2a if the conditions corresponding to (1), (2), and (4) at Step S115 in the first embodiment are met.

At Step S215, the controller 12 engages the lock-up clutch 2a. If the engine rotation speed is smaller than the first predetermined speed and also, larger than the third predetermined speed and moreover, the engine rotation deceleration is at the turbine rotation deceleration or less, the engine rotation speed is quickly lowered by engaging the lock-up clutch 2a.

Next, the advantages of the second embodiment will be described.

If the engine rotation speed is smaller than the first predetermined speed and also, the engine rotation deceleration is at the turbine rotation deceleration or less, by engaging the lock-up clutch 2a until the engine rotation speed becomes the third predetermined speed, the lock-up clutch 2a is not released even if the engine rotation speed becomes the second predetermined speed in the first embodiment, for example. Thus, a sense of discomfort involved with release of the lock-up clutch 2a given to the driver can be suppressed.

In the coast stop control in the above embodiment, engagement of the lock-up clutch 2a refers to a state in which, between the engine side and the driving wheel side of the lock-up clutch 2a, during transition from the released state in which rotation is not fully transmitted (fully released state) to the engaged state in which the rotation is transmitted without loss (fully engaged state), a rotation transmission amount to the engine 1 is larger than the case in which the torque converter 2 sets the lock-up clutch 2a in the fully released state and may include the transmission of rotation by a slip state. Also, release of the lock-up clutch 2a refers to a state in which, between the engine side and the driving wheel side of the lock-up clutch 2a, in transition from the fully engaged state to the fully released state, the rotation transmission amount to the engine 1 is smaller than the case in which the torque converter 2 sets the lock-up clutch 2a in the fully engaged state and may include the transmission of rotation by the slip state.

Also, the third predetermined speed may be larger than the first predetermined speed or the second predetermined speed, and if the third predetermined speed is larger than the first predetermined speed or the second predetermined speed, the above-described coast stop control is executed until the engine rotation speed becomes the third predetermined speed.

Also, if the accelerator pedal is depressed during coast stop for re-acceleration, the controller 12 releases (including the slip state) the lock-up clutch 2a and re-starts the engine 1.

Also, instead of the lock-up clutch 2a, the frictional engagement element of the sub-transmission mechanism 30 of the transmission 4 (the low brake 32 or the like) may be engaged or released, and in that case, the lock-up clutch 2a is preferably engaged. The torque converter 2 is capable of transmitting rotation through a fluid (even if the lock-up clutch 2a is in the released state) but since transmission loss occurs, control accuracy of the engine rotation speed can be improved by engaging the lock-up clutch 2a.

In this case, the frictional engagement element engaged during the coast stop control is a frictional engagement element which achieves a gear position at the start of the coast stop control. Specifically, if the coast stop control is started at the second speed, the high clutch 33 is engaged, or if the coast stop control is started at the first speed, the low brake 32 is engaged.

Also, in the above-described embodiment, the controller 12 engages or releases the lock-up clutch 2a by using the engine rotation deceleration and the turbine rotation deceleration but may engage or release the lock-up clutch 2a only by the turbine rotation deceleration. In this case, the controller 12 engages or releases the lockup clutch 2a by comparing predetermined deceleration that can be determined to be rapid deceleration and the calculated turbine rotation deceleration. As a result, engagement or release of the lock-up clutch 2a in the coast stop control can be performed with simple control.

The present invention is not limited to the above-described embodiments, but it is needless to say that various changes and improvements that can be made within the range of its technical idea are included.

This application claims priority from Japanese Patent Application No. 2010-269027, filed Dec. 2, 2010, which is incorporated herein by reference in its entirety.

What is claimed is:

1. A coast stop vehicle which executes a coast stop control for stopping an engine during travel of the vehicle, comprising:
    a frictional engagement element provided between the engine and a driving wheel;
    a first deceleration calculating unit configured to calculate a first deceleration, which is rotation deceleration of a rotation shaft on a driving wheel side of the frictional engagement element;
    an engine rotation speed detecting unit configured to detect an engine rotation speed;
    a second deceleration calculating unit configured to calculate a second deceleration, which is engine rotation deceleration; and
    an engagement-state control unit configured to
        control an engagement state of the frictional engagement element such that a decrease of the engine rotation speed is suppressed based on the first deceleration and the second deceleration while the coast stop control is executed,
        release the frictional engagement element if the engine rotation speed is smaller than a first predetermined speed at which the engine is re-startable by re-injection of fuel, and the second deceleration is larger than the first deceleration, and engage the frictional engagement element if the engine rotation speed is smaller than the first predetermined speed, and the second deceleration is equal to or less than the first deceleration.

2. The coast stop vehicle according to claim 1, wherein the engagement-state control unit is configured to:
    engage the frictional engagement element if the engine rotation speed is equal to or greater than the first predetermined speed, and the second deceleration is larger than the first deceleration; and
    release the frictional engagement element if the engine rotation speed is equal to or greater than the first predetermined speed, and the second deceleration is equal to or less than the first deceleration.

3. The coast stop vehicle according to claim 1, wherein the engagement-state control unit is configured to release the frictional engagement element if the engine rotation speed is equal to or less than a second predetermined speed at which the engine is startable by a starter.

4. The coast stop vehicle according to claim 1, wherein the engagement-state control unit is configured to release the frictional engagement element if the engine rotation speed is equal to or less than a third predetermined speed at which car body vibration occurs.

5. The coast stop vehicle according to claim 1, wherein the frictional engagement element is a lock-up clutch of a torque converter.

6. A control method of a coast stop vehicle, in which a coast stop control for stopping an engine during travel of a vehicle is executed, the control method comprising:
    calculating a first deceleration, which is rotation deceleration of a rotation shaft on a driving wheel side of a frictional engagement element provided between the engine and a driving wheel;
    detecting an engine rotation speed;
    calculating a second deceleration, which is engine rotation deceleration; and
    controlling an engagement state of the frictional engagement element such that a decrease of the engine rotation speed is suppressed based on the first deceleration and the second deceleration, while the coast stop control is executed,
    wherein the frictional engagement element is released if the engine rotation speed is smaller than a first predetermined speed at which the engine is re-startable by re-injection of fuel, and the second deceleration is larger than the first deceleration, and
    wherein the frictional engagement element is engaged if the engine rotation speed is smaller than the first predetermined speed, and the second deceleration is equal to or less than the first deceleration.

7. The control method according to claim 6, wherein
    the frictional engagement element is engaged if the engine rotation speed is equal to or greater than the first predetermined speed, and the second deceleration is larger than the first deceleration; and
    the frictional engagement element is released if the engine rotation speed is equal to or greater than the first predetermined speed, and the second deceleration is equal to or less than the first deceleration.

8. The control method according to claim 6, wherein
    the frictional engagement element is released if the engine rotation speed is equal to or less than a second predetermined speed at which the engine is startable by a starter.

9. The control method according to claim 6, wherein
    the frictional engagement element is released if the engine rotation speed is equal to or less than a third predetermined speed at which car body vibration occurs.

10. The control method according to claim 6, wherein
    the frictional engagement element is a lock-up clutch of a torque converter.

11. A coast stop vehicle which executes a coast stop control for stopping an engine during travel of the vehicle, comprising:
    a frictional engagement element provided between the engine and a driving wheel;
    first deceleration calculating means for calculating a first deceleration, which is rotation deceleration of a rotation shaft on a driving wheel side of the frictional engagement element;
    an engine rotation speed detecting means for detecting an engine rotation speed;
    a second deceleration calculating means for calculating a second deceleration, which is engine rotation deceleration; and
    engagement-state control means for controlling an engagement state of the frictional engagement element such that a decrease of the engine rotation speed is suppressed based on the first deceleration and the second deceleration while the coast stop control is executed,
    wherein the engagement-state control means releases the frictional engagement element if the engine rotation speed is smaller than a first predetermined speed at which the engine is re-startable by re-injection of fuel, and the second deceleration is larger than the first deceleration, and
    wherein the engagement-state control means engages the frictional engagement element if the engine rotation speed is smaller than the first predetermined speed, and the second deceleration is equal to or less than the first deceleration.

* * * * *